L. WEINBERG.
FISH SCALER.
APPLICATION FILED FEB. 28, 1917.
1,235,085.
Patented July 31, 1917.
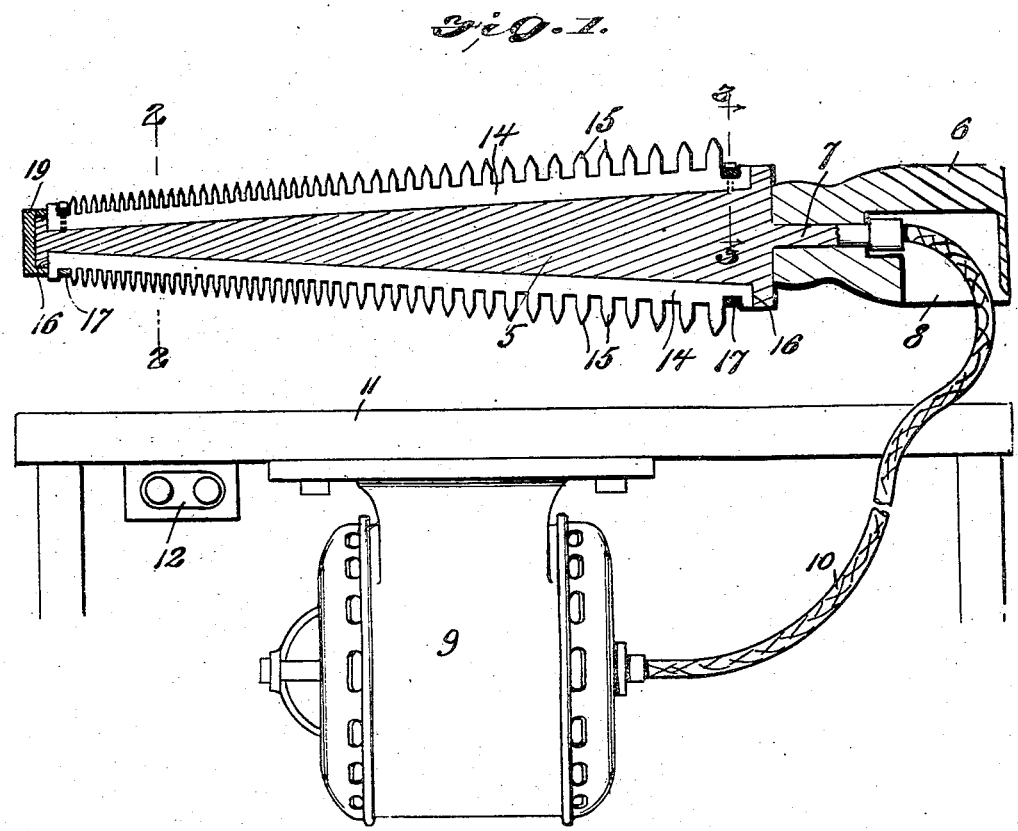
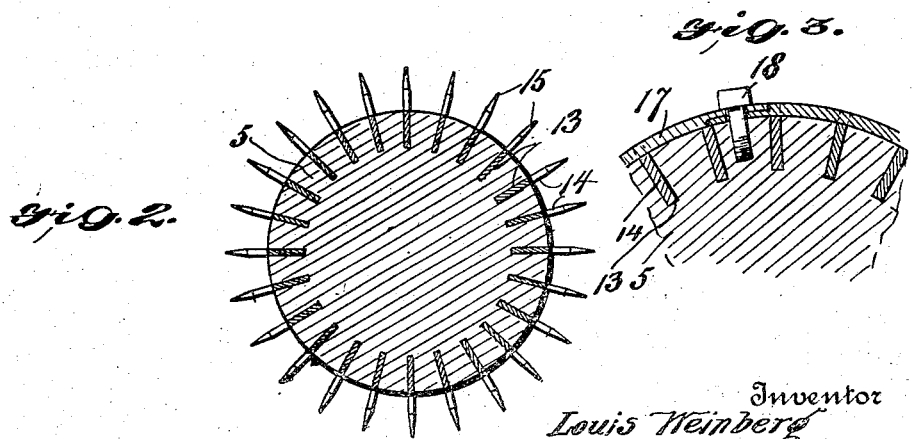
Inventor
Louis Weinberg
By
Attorneys

UNITED STATES PATENT OFFICE.

LOUIS WEINBERG, OF CHICAGO, ILLINOIS.

FISH-SCALER.

1,235,085.

Specification of Letters Patent.

Patented July 31, 1917.

Application filed February 28, 1917. Serial No. 151,472.

*To all whom it may concern:*

Be it known that I, LOUIS WEINBERG, a citizen of the United States, residing at Chicago, in the county of Cook and State of Illinois, have invented new and useful Improvements in Fish-Scalers, of which the following is a specification.

This invention relates to devices for removing the scales from fishes, and its object is to provide a device of this kind which is highly efficient and rapid in operation and at the same time simple in construction.

With the object stated in view, the invention consists in a novel combination and arrangement of parts to be hereinafter described and claimed, and in order that the same may be better understood reference is had to the accompanying drawing forming a part of this specification.

In the drawing,

Figure 1 is a longitudinal section of the utensil, and

Figs. 2 and 3 are enlarged cross sections on the lines 2—2 and 3—3 of Fig. 1.

Referring specifically to the drawing, 5 denotes a mandrel which carries the scraper devices to be presently described. To one end of the mandrel is fitted a handle 6, a fragment of which is shown in Fig. 1, this end of the mandrel having a spindle extension 7 seating in an axial aperture in the outer end of the handle, and in the side of the latter is an opening 8 communicating with the aperture in which the spindle seats. The mandrel is driven by an electric motor 9 through a flexible shaft 10 connected to the spindle 7, said shaft passing into the opening 8 for connection to the spindle. The motor 9 is mounted beneath a table or bench 11, which latter also carries a switch 12 controlling the motor circuit.

In the periphery of the mandrel 5 are longitudinal slots 13 in which seat scraper blades 14 which project from said periphery and have their projecting portions toothed as shown at 15. The mandrel is tapered in the direction of its outer end, and the scraper teeth are gradually reduced in width in the direction of said end, the spacing between the teeth also gradually decreasing in the same direction.

The slots 13 do not extend throughout the entire length of the mandrel 5 which leaves shoulders 16 against which the ends of the scraper blades 14 abut, whereby they are held against longitudinal displacement. Radial displacement is prevented by split retaining bands 17 encircling the mandrel adjacent to its ends, and seating in grooves in the corresponding ends of the scraper blades. The ends of the bands are overlapped, and screws 18 pass through the lapping ends into the mandrel as shown in Fig. 3. To the outer end of the mandrel is applied a screw cap 19 which abuts against the outer ends of the blades 14 and assists to prevent longitudinal movement of said blades on the mandrel in the direction of its outer end. The blades 14 can be readily removed from the mandrel after slipping off the bands 17 and removing the cap 19.

The device is operated by firmly grasping the handle 6 and passing the toothed scraper portion across the fish while the latter is held down on the table 11 with the other hand. The rapid rotary movement of the scraper portion effects a thorough and quick removal of the scales, the large toothed portion being employed on fishes having large scales, and the smaller section on fishes having fine or soft scales.

I claim:—

1. A fish scaler comprising a mandrel, a series of toothed scraper blades carried by the mandrel, said mandrel having longitudinal slots terminating short of the ends thereof, the scraper blades seating in said slots and abutting at their ends against the end walls of the slots, the teeth of the blades projecting therefrom, the outer edges of the blades adjacent to the ends thereof being grooved, and retaining bands encircling the mandrel and the scraper blades carried thereby, and seating in the aforesaid end grooves of the latter.

2. A fish scaler comprising a mandrel, and a series of toothed scraper blades carried by the mandrel and extending in the direction of the length thereof, said mandrel being tapered in the direction of one end, and the teeth of the scraper blades being gradually reduced in size in the direction of the smaller end of the mandrel.

3. A fish scaler comprising a mandrel tapered in the direction of one of its ends, and a series of scraper teeth carried by said mandrel, said scraper teeth being gradually reduced in size in the direction of the smaller end of the mandrel and the spacing between the teeth being also reduced in width in the same direction.

In testimony whereof I affix my signature.

LOUIS WEINBERG.